(12) United States Patent
Flowers et al.

(10) Patent No.: US 7,073,198 B1
(45) Date of Patent: Jul. 4, 2006

(54) METHOD AND SYSTEM FOR DETECTING A VULNERABILITY IN A NETWORK

(75) Inventors: John S. Flowers, Berkeley, CA (US); Thomas C. Stracener, Berkeley, CA (US)

(73) Assignee: nCircle Network Security, Inc., San Francisco, CA (US)

( * ) Notice: Subject to any disclaimer, the term of this patent is extended or adjusted under 35 U.S.C. 154(b) by 642 days.

(21) Appl. No.: 09/648,211

(22) Filed: Aug. 25, 2000

Related U.S. Application Data

(60) Provisional application No. 60/150,905, filed on Aug. 26, 1999.

(51) Int. Cl.
*G06F 11/30* (2006.01)
(52) U.S. Cl. .............................. 726/25; 726/23; 726/34; 713/151
(58) Field of Classification Search ................ 713/201, 713/200
See application file for complete search history.

(56) References Cited

U.S. PATENT DOCUMENTS

| | | | |
|---|---|---|---|
| 5,136,523 A | 8/1992 | Landers | 395/54 |
| 5,278,901 A | 1/1994 | Shieh et al. | 380/4 |
| 5,388,211 A * | 2/1995 | Hornbuckle | 717/178 |
| 5,440,723 A * | 8/1995 | Arnold et al. | 714/2 |
| 5,557,742 A | 9/1996 | Smaha et al. | |
| 5,699,403 A | 12/1997 | Ronnen | |
| 5,796,942 A | 8/1998 | Esbensen | |
| 5,798,706 A | 8/1998 | Kraemer et al. | |
| 5,802,320 A | 9/1998 | Baehr et al. | 395/200.79 |
| 5,850,516 A | 12/1998 | Schneier | |
| 5,892,903 A | 4/1999 | Klaus | 395/187.01 |
| 5,919,257 A | 7/1999 | Trostle | |
| 5,923,646 A | 7/1999 | Mandhyan | |
| 5,925,126 A * | 7/1999 | Hsieh | 713/200 |
| 5,931,946 A | 8/1999 | Terada et al. | |
| 5,958,015 A | 9/1999 | Dascalu | |
| 5,961,644 A | 10/1999 | Kurtzberg et al. | |
| 5,991,881 A | 11/1999 | Conklin et al. | |
| 6,006,328 A * | 12/1999 | Drake | 713/200 |
| 6,088,804 A * | 7/2000 | Hill et al. | 713/201 |
| 6,101,606 A * | 8/2000 | Diersch et al. | 713/201 |
| 6,185,689 B1 | 2/2001 | Todd, Sr. et al. | |
| 6,199,181 B1 * | 3/2001 | Rechef et al. | 714/38 |

(Continued)

FOREIGN PATENT DOCUMENTS

WO    WO 01/31420 A2    5/2001

(Continued)

OTHER PUBLICATIONS

Ristenbatt, Marllin, Methodology for Network Communication Vulnerability Analysis, 1988, IEEE, pp. 493-499.*

(Continued)

*Primary Examiner*—Christopher Revak
*Assistant Examiner*—Aravind K Moorthy
(74) *Attorney, Agent, or Firm*—Fenwick & West

(57) ABSTRACT

A system and method in accordance with the invention reliably and non-intrusively identifies various conditions of a network. In particular, an embodiment of the invention can identify an operating system, including version and patch level, and a service, including version and patch level, of a remote host on the network. Using this information, an embodiment of the invention can then reliably identify a vulnerability condition of the network. In some embodiments, the operating system and service information can be used to identify a trojan application, unlicensed software use, security policy violations, or even infer vulnerabilities that are yet unknown.

6 Claims, 4 Drawing Sheets

U.S. PATENT DOCUMENTS

| | | | |
|---|---|---|---|
| 6,263,444 B1 | 7/2001 | Fujita | |
| 6,269,447 B1 | 7/2001 | Maloney et al. | |
| 6,279,113 B1 | 8/2001 | Vaidya | |
| 6,282,546 B1 | 8/2001 | Gleichauf et al. | |
| 6,298,445 B1* | 10/2001 | Shostack et al. | 713/201 |
| 6,301,668 B1 | 10/2001 | Gleichauf et al. | |
| 6,321,338 B1 | 11/2001 | Porras et al. | |
| 6,324,656 B1 | 11/2001 | Gleichauf et al. | |
| 6,330,562 B1 | 12/2001 | Boden et al. | |
| 6,343,362 B1 | 1/2002 | Ptacek et al. | |
| 6,347,376 B1 | 2/2002 | Attwood et al. | |
| 6,359,557 B1 | 3/2002 | Bilder | |
| 6,363,489 B1 | 3/2002 | Comay et al. | |
| 6,370,648 B1 | 4/2002 | Diep | |
| 6,408,391 B1 | 6/2002 | Huff et al. | |
| 6,415,321 B1 | 7/2002 | Gleichauf et al. | |
| 6,470,384 B1 | 10/2002 | O'Brien | |
| 6,473,800 B1 | 10/2002 | Jerger et al. | |
| 6,477,651 B1 | 11/2002 | Teal | 713/200 |
| 6,484,203 B1 | 11/2002 | Porras et al. | |
| 6,484,315 B1 | 11/2002 | Ziese | |
| 6,490,626 B1* | 12/2002 | Edwards et al. | 709/229 |
| 6,502,135 B1 | 12/2002 | Munger et al. | |
| 6,574,737 B1 | 6/2003 | Kingsford et al. | |
| 6,578,147 B1 | 6/2003 | Shanklin et al. | |
| 6,584,569 B1* | 6/2003 | Reshef et al. | 713/201 |
| 6,609,205 B1 | 8/2003 | Bernhard et al. | |
| 6,611,869 B1 | 8/2003 | Eschelbeck et al. | 709/228 |
| 6,687,833 B1 | 2/2004 | Osborne et al. | |
| 6,704,873 B1 | 3/2004 | Underwood | 713/201 |
| 6,708,212 B1 | 3/2004 | Porras et al. | |
| 6,711,127 B1 | 3/2004 | Gorman et al. | |
| 6,718,535 B1 | 4/2004 | Underwood | 717/101 |
| 6,735,169 B1 | 5/2004 | Albert et al. | |
| 6,735,702 B1 | 5/2004 | Yavatkar et al. | |
| 6,771,597 B1 | 8/2004 | Makansi et al. | |
| 6,775,657 B1 | 8/2004 | Baker | |
| 6,778,524 B1 | 8/2004 | Augart | 370/351 |
| 6,789,216 B1* | 9/2004 | Zagorski et al. | 714/38 |
| 6,816,973 B1 | 11/2004 | Gleichauf et al. | 713/201 |
| 6,826,172 B1 | 11/2004 | Augart | 370/351 |
| 2002/0133721 A1 | 9/2002 | Adjaoute | |

FOREIGN PATENT DOCUMENTS

| | | |
|---|---|---|
| WO | WO 01/84270 A2 | 11/2001 |
| WO | WO 02/19661 A2 | 3/2002 |
| WO | WO 02/45380 A2 | 6/2002 |
| WO | WO02061544 A2 * | 8/2002 |
| WO | WO03084181 A1 * | 10/2003 |
| WO | WO 03/100617 A1 | 12/2003 |

OTHER PUBLICATIONS

Skaggs et al, Network Vulnerability Analysis, 2002, IEEE, pp. 493-495.*

Thatcher, Michelle, Keeping your Technology Secure, 2002, Technology & Learning, pp. 38, 40, 42, and 44.*

Rebecca Bace, Infidel, Inc. "An Introduction to Intrusion Detection and Assessment", 1999, 38 pages.

Fyodor, "Remote OS detection via TCP/IP Stack FingerPrinting", Oct. 18, 1998, 10pages.

Abstract, W. Erhard, et al., "Network Traffic Analysis and Security Monitoring With UniMon", Proceeding of the IEEE Conference on High Performance Switching and Routing, 2000, ATM 2000, pp. 439-446 (Jun. 2000).

Abstract, Dept. of Comput. Sci., California Univ., Davis, CA, USA, "A Methodology For Testing Intrusion Detection Systems", IEEE Transactions on Software Engineering, vol. 22, Issue 10, pp. 719-729 (Oct. 1996).

Abstract, Monji A. Le Charlier, et al., "Distributed Audit Trail Analysis", Proceeding of the Symposium on Network and Distributed System Security, 1995, pp. 102-112 (Feb. 16-17, 1995).

Abstract, L.T. Heberlein, et al., "A Network Security Monitor" Proceeding of the 990 IEEE Computer Society Symposium on Research in Security and Privacy, pp. 296-04, (May 7-9, 1990).

Abstract, Xinzhou Quin et al., "Integrating Intrusion Detection and Network Management", Network Operation and Management Symposium, 2002. NAOMS 2002. 2002 IEEE/IFIP, pp. 329-344 (Apr. 15-19, 2002).

Abstract, D.G. Schwartz et al., "A Case-Based Approach To Network Intrusion Detection", Proceeding of the 5th International Conference on Information Fusion, 2002. vol. 2 pp. 1084-1089 (Jul. 8-11, 2002).

Abstract, "Open Source Security: Opportunity or Oxymoron?" Computer, vol. 35, Issue 3, pp. 18-21 (Mar. 2002).

Abstract, Liu Dihua, et al. "Data Mining For Intrusion Detection", Proceedings ICII 2001—Beijing 2001 International Conference on Info-Tech and Info-Net, 2001, vol. 5, pp. 7-12, (Oct. 29-Nov. 2001).

Abstract, Kai Hwang & M. Gangadharan, "Micro-Firewalls for Dynamic Network Security With Distributed Intrusion Detection", NCA 2001 IEEE International Symposium on Network Computing and Applications, 2001. pp. 68-79, (Oct. 8-10, 2001).

Abstract, Wenke Lee Stolfo, et al., "Real Time Data Mining-Based Intrusion Detection", Proceedings DARPA Information Survivability Conference & Exposition II, 2001, DISCEX '01. vol. 1, pp. 89-100 (Jun. 12-14, 2001).

Abstract, J. Burns, et al. Automatic Management Of Network Security Policy, Proceedings DARPA Information Survivability Conference & Exposition II 2001, DISCEX '01. vol. 2, pp. 12-26, (Jun. 12-14, 2001).

Abstract, Heberlein, et al. "A Network Security Monitor", 1990, Proceeings Research in Security & Privacy 1990 IEEE Computer Society Symposium on, pp. 296-304, (May 7-9, 1990).

"Microsoft Computer Dictionary Fifth Edition," 2002, 6 pages.

Anderson, Teresa, "Hunting for Holes," Security Management, Arlington, Apr. 1996, 2 pages.

Breyfogle, Stacey, "Don't Stop at Your Servers," Software Magazine, Englewood, Jan. 1998, pp. 1-3.

Johnson, Johna Till, "Simulated Attack for Real Network Security," Data Communications, Nov. 2, 1995, pp. 31-32.

Anonymous, Microsoft Computer Dictionary, 2002, Microsoft Press, Fifth Edition, p. 291.

Phipatanasuphorn et al., Vulnerability of Sensor Networks to Unauthorized Traversal and Monitoring, IEEE Transactions On Computers, Mar. 2004, pp. 364-369.

Yurcik, William, Controlling Intrusion Detection Systems by Generating False Positives: Squealing Proof-of-Concept, Proceedings of the 27th Annual IEEE Conference on Local Computer Networks, 2002, pp. 134-135.

* cited by examiner

METHOD AND SYSTEM FOR DETECTING A VULNERABILITY IN A NETWORK

RELATED APPLICATIONS

This application claims the benefit of U.S. Provisional Application No. 60/150,905, filed Aug. 26, 1999, and incorporated herein by reference.

FIELD OF THE INVENTION

The present invention generally relates to network security, and more particularly, to a method and system for securing a network by detecting vulnerabilities in the network.

BACKGROUND

Computer networks are vulnerable to many threats that can inflict damage that can result in significant losses. These losses can stem from a number of sources including environmental hazards, hardware and software failure, user errors, or even malicious acts of others. A goal of network security is therefore to protect the confidentiality, integrity, and availability of information stored electronically in a network from these threatening sources.

In general, a network is a distributed computing environment with two or more hosts connected to a common framework for information exchange. Communication among networks and hosts within networks is frequently based on the OSI Model and is in accordance with a protocol, such as a TCP/IP protocol. Both the OSI Model and TCP/IP will be understood by one of ordinary skill in the art.

With the TCP/IP protocol, data to be communicated is placed in data packets. FIG. 1 illustrates the structure of a standard IP packet, which will be familiar to one of ordinary skill in the art. The packet 111 includes a header 115 and a data portion 110. The fields of the IP header are generally well-known in the art, and are described in detail in RFC-791, "Internet Protocol," Postel, September 1981 (available at www.ietf.org/rfc). Nonetheless, the fields are summarized here.

The Version field 130 describes the version of the Internet protocol being used by the machine sending the data. Since header length is not constant, the Internet Header Length (IHL) 135 describes the number of the 32-bit words in the header 115. The IHL field 135 allows the receiving machine to calculate where the header 115 ends and the data 110 portion begins.

The Type of Service field 140 provides an indication of the abstract parameters of the quality of service desired. For instance, various combinations of reliability and speed are available.

The Total Length field 145 is the length of the packet, measured in octets 125, including the header 115 and data 110. An Identification field 150 is assigned by the sender to aid in assembling fragments of a packet.

A three bit field of various control flags 155 is provided. The first bit is unused and always zero. The next bit DF is a "Don't fragment" bit: it allows fragmentation when set to 0 but indicates no fragmentation when set to 1. If DF is set to "1," it is an order to routers not to fragment the packet because the destination is incapable of putting the pieces back together again. The third bit MF is a "More Fragments" bit: it indicates the last fragment in series when set to 0; it indicates that there are more fragments in the series when set to 1.

The Fragment Offset field 160 indicates where in the entire datagram the fragment belongs. The fragment offset is measured in units of 8 octets (64 bits). The first fragment has offset zero.

The Time to Live (TTL) field 165 indicates the maximum time the datagram 111 is allowed to remain in the internet system. The Protocol field 170 indicates the next level protocol used in the data 110 portion of the packet. The Header Checksum 175 verifies the header only and is recomputed and verified at each point that the header 115 is processed.

The Source address 180 and Destination address 185 are 32 bit fields used to indicate the source and destination of a packet. The Options field 190 varies and may or may not appear in the packet 111. The Options field may also be padded to ensure that the header 115 ends on a 32 bit boundary.

Several conventional resources are available to protect a network from information losses. For instance, firewalls are used to enforce a boundary between two or more networks to filter incoming traffic (generally from the Internet) according to a security policy. Still, firewalls are inadequate to fully protect a network since users may not always obtain access to a network through the Internet (for instance, a user could circumnavigate the firewall by using a modem connection). In addition to the many ways a network can be attacked externally, not all threats originate outside the firewall and can come from within the network. Further, firewalls themselves are subject to attack many of which can render the firewall ineffective.

Therefore, networks need to rely on resources other than firewalls for network security. Such resources include vulnerability assessment tools.

Vulnerability assessment tools perform examinations of a network to determine weaknesses in the network that might allow security violations. The results of a vulnerability assessment tool represent a snapshot of a network's security at a particular point in time. Thus, vulnerability assessment tools determine where in a network an attack is possible.

Vulnerability assessment tools typically use two methodologies, either separately or in conjunction, for performing the network examination: (1) an active inspection of a network that launches known malicious attacks against the network to determine the network's susceptibility to those attacks; and/or (2) a passive inspection of a network that inspects the network's device and service configurations (known as service banners) for particular settings that are known to be vulnerable to attacks.

The active methodology actually reenacts a series of known attacks, recording the results of the attacks to discover vulnerabilities in the network. "Known attacks" are generally the methods and exploit scripts that can be commonly referenced on security related Internet locations or sites (e.g., www.rootshell.com) and mailing lists (e.g., BUGTRAQ) that are also often referred to by hackers (also referred to as crackers) to construct attacks on a network or individual machine. Using this active methodology, a vulnerability is discovered when the reenacted attack is able to penetrate the network and, in many instances, "crash" or disable the network. Obviously, a severe limitation of this methodology is that an undue risk is put on the network being tested. For instance, should a vulnerability be detected by the test attack resulting in a network crash, information on the network may be lost.

The passive methodology does not subject the network to the undue risk of the active methodology, but it has other limitations. The passive methodology checks packet information, commonly known as "service banners," that identifies network services and devices. The service banner is used to check a database of known vulnerabilities for that particular service banner.

A service banner generally contains four fields. For example, consider the following sample service banner:

220-FTP Server (wuftpd 2.4.2) ready.

In this example, Field 1 is the number 220, and is a reply code indicating the service is ready for a new user. Field 2, here "FTP Server," identifies the type of service being used. Field 3, here "(wuftpd 2.4.2)," indicates the software and version of the service. And Field 4, "ready," is a message indicating that the service is ready for user supplied input.

The service banner is easily obtained from a network by using telnet to access ports on which services processes are resident. The telnet protocol will be understood by those in the art, and is described in the RCF-764, "Telnet Protocol Specification", J. Postel, Jun. 1, 1980 (available at www.i-etf.org/rfc). In this methodology, the service banner is then compared against a database of service banners that have a list of known vulnerabilities.

While the passive methodology may be safer than the active methodology, it is not accurate or reliable for many reasons. First, service banners are easily configurable and may not accurately name the type of network service enabled on a host. Thus, in the service banner example above, the service is defined in fields 2 and 3 of the banner as FTP Server (wuftpd 2.4.2). That service may be reconfigured easily by an individual so that the network service is no longer accurately described by the service banner. Therefore, any vulnerability detected for the inaccurate device or service would be a false detection. In particular, hackers will commonly attempt to hide any "back doors" or vulnerabilities found in a network by editing the service banner information so that another hacker will not be able to notice a quick entrance into the network. Some vulnerabilities are therefore hidden from this passive methodology.

Another reason using service banners is unreliable is that service banners do not accurately reflect the patch level of the network service and therefore critical fixes to the network may have been applied that are not reflected in the service banner. Patch levels refer to the degree to which the source code of the service or program has been modified by functionality or security fixes. A patch is understood as a specific alteration in the code of a service or program for the purpose of altering some specific aspect of the service or program's functionality or eliminating a bug or security risk.

Still another reason that use of service banners as a means of vulnerability detection is undesirable is that it places systems on the network in undue risk. In particular, service banners must be openly displayed in order for the presence of vulnerabilities in a network to be inferred. As such, the service banners are available to any remote user, malicious or otherwise. A common method of network reconnaissance employed by hackers is to examine the service banners on machines across a network in order to identify vulnerable points of attack.

One alternative to these two methodologies (active and passive) has been to use a method of information gathering known as "fingerprinting." This method is described in the publication entitled "Remote OS Dectection Via TCP/IP Stack Fingerprinting" by Fyodor, dated Oct. 18, 1998. This publication describes a "fingerprinting" of the operating system of machines on a network for purposes of determining the operating system type. Once an operating system is known, then other techniques may be employed to assess a vulnerability (fingerprinting does not itself assess vulnerabilities).

Nonetheless, while fingerprinting can identify the operating system in some instances, it cannot always do so accurately, and it cannot identify the patch level of the operating system. Moreover, while fingerprinting can sometimes identify active ports in use by a host, it cannot always do so accurately and it cannot identify the services that are running on those ports. All of these deficiencies limit the accurate detection of vulnerabilities.

A need therefore exists for a method and system of detecting vulnerabilities that does not subject the network being analyzed to undue risks (unlike the active approach), is accurate and reliable (unlike the passive approach), and is able to accurately identify more information from the network than only the operating system (unlike the Fyodor approach). A further need exists for a method and system that not only detects current vulnerabilities of a network, but also infers vulnerabilities not yet existing on the network.

SUMMARY

A system and method in accordance with the invention reliably and non-intrusively identifies various conditions of a network. In particular, an embodiment of the invention can identify an operating system, including version and patch level, and a service, including version and patch level, of a remote host on the network. Using this information, an embodiment of the invention can then reliably identify a vulnerability condition of the network. In some embodiments, the operating system and service information can be used to identify a trojan application, unlicensed software use, security policy violations, or even infer vulnerabilities that are yet unknown.

One embodiment of the invention sends several sets of packets to a remote host on a network and based on the responses to those packets identifies the operating system (including version and patch level) and services (including version and patch level) operating on the host. Specifically in one embodiment, three sets of packets are sent to a host to identify the operating system. The responses to each set of packets are reflexively (automatically) produced by the host and do not undesirably intrude upon the host in any way. When responses are received they are compared to a database of "reflex signatures." The comparison yields some information about the operating system. Based on this information, the responses to the first set of packets are used to tailor the second set of packets. Likewise, the responses to the second set of packets are used to tailor the third set of packets. The three sets of responsive packets are used to accurately identify the operating system, including its version and patch level, of a particular host.

The operating system information identified is then used to tailor packets to send to the host to identify the services operating on the remote host. In one embodiment and in a similar manner to that done for the operating system, two sets of packets are sent to the host to identify the services, including version and patch level, operating on the host.

The information gleaned from identifying the services will allow the determination of vulnerabilities on the network or other information.

In this manner, a network can be examined in a non-intrusive and efficient manner to accurately assess network vulnerabilities.

BRIEF DESCRIPTION OF THE DRAWINGS

The present invention will be described with respect to particular embodiments thereof, and reference will be made to the drawings in which.

DETAILED DESCRIPTION

A system in accordance with the invention is designed to provide a fast, yet non-invasive vulnerability testing system that provides high confidence in results. Unlike conventional systems, a system in accordance with the invention first determines the operating system, including version number, that is running on the host under test. To do so, a system in accordance with the invention takes advantage of the fact that each host operating system responds to non-traditional packets differently. Therefore, by sending certain selected packets to a host, the responsive packets returned by the host can be used to identify the operating system running. Hence, a process performed in accordance with the invention is sometimes referred to herein as "reflex testing." Once the operating system is identified, services that are running on a host can be determined and ultimately potential vulnerabilities are identified.

System Overview

Figure 1:
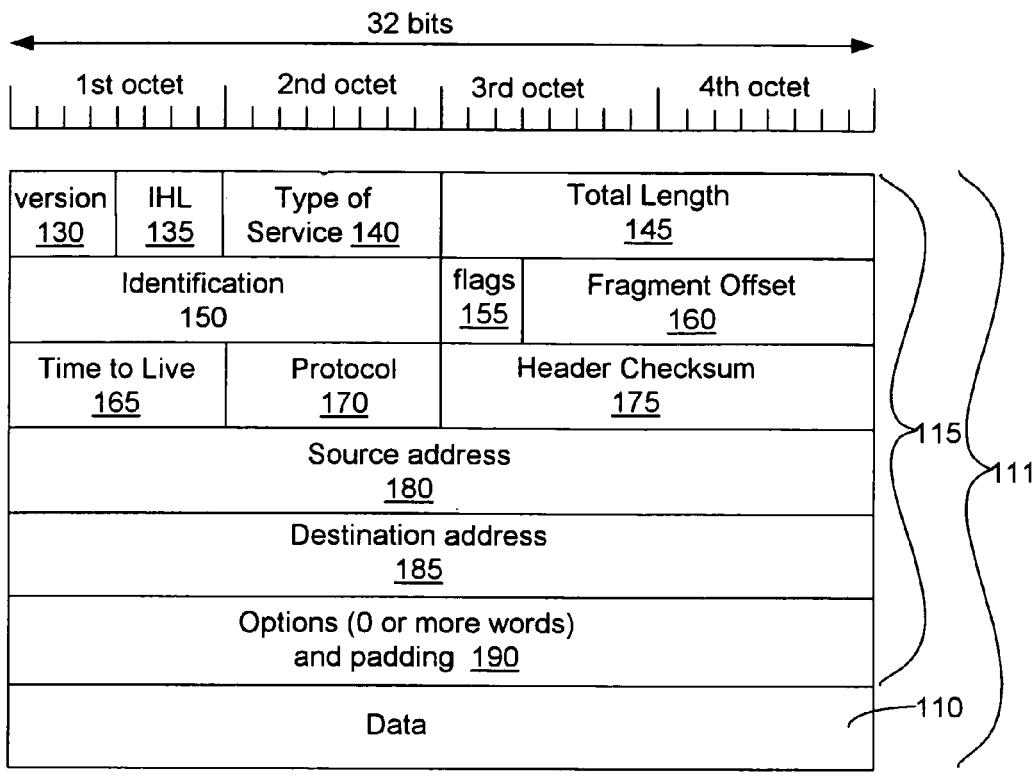
FIG. 1 is a block diagram of an IP packet.
Figure 2:
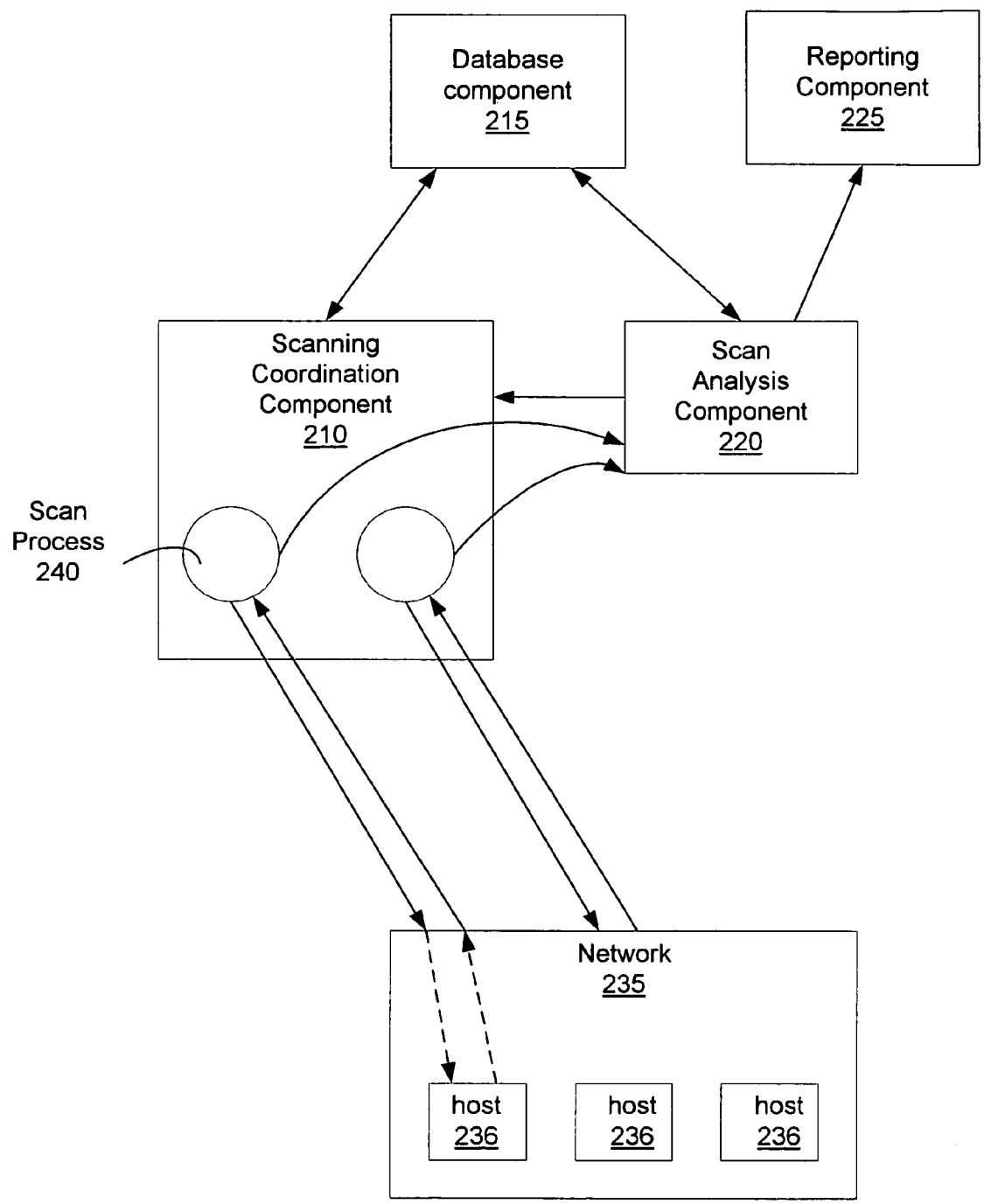
FIG. 2 is a functional block diagram of an embodiment of a system in accordance with the present invention.

FIG. 2 is a high-level functional block diagram of a system 200 in accordance with an embodiment of the present invention that is to perform vulnerability testing on network 235. The system 200 generally includes three core components including a scanning coordination component 210, a database component 215, and a scan analysis component 220. In some embodiments, a reporting component 225 is also included for generating various reports. It is noted that this system 200 may be distributed geographically or may be part of a system at one particular location. Thus, the system 200 may be remote from the network 235 and the transmissions 230 to and from network 235 may be over a telecommunications network, a wireless network, or over a network such as the Internet in various embodiments.

The scanning coordination component 210 initiates the testing (scanning) procedure. It instantiates scanning processes 240, each of which is responsible for scanning a host 236 on network 235. Scanning processes 240 are also sometimes referred to as scanning engines or scanning daemons. Each scanning process 240 constructs and sends custom packets to a host on network 235 and receives packets back from the hosts. Each scan process 240 is functionally distinct from other scan processes 240 in that each sends data to a distinct host under test and relays this data to the scan analysis component 220 independently of other scan processes. Scanning coordination component 210 spawns as many scanning processes 240 as required for complete scanning of all hosts on network 235.

Once data is gathered by a scan process 240 regarding a host on network 235, then the data is sent by the scan process 240 to scan analysis component 220. The scan analysis component 220 analyzes data sent from the scan process 240 and communicates with the scan coordination component 210 based on the results of that analysis.

In one embodiment, when scan analysis component 220 receives a data packet for a particular host, scan analysis component compares the received data to data stored in database component 215, which stores information regarding known operating systems, services, and vulnerabilities. The scan analysis component 220 in some embodiments also performs various analyses on incoming data for the purpose of drawing inferences about the presence of other vulnerabilities on the network 235.

Scan analysis component 220 then communicates the relevant information to scan coordination component 210, which also accesses database component 215 to initiate a next appropriate scan process 240 for further testing. The scan analysis component 220 also relays relevant information to other peripheral components of system 200, such as reporting component 225, for performance of audits, etc.

As will be understood by those of skill in the art, while all or part of a system 200 can be implemented in hardware, an embodiment of a system 200 in accordance with the invention and as described herein is a set of object-oriented components that dynamically interact to perform the steps for vulnerability detection, vulnerability analysis, and reporting functions as described. Thus, as object-oriented components, the system 200 is a software- or firmware-based system that includes processor readable code that is practically implemented in a computer system, such as a desktop-computer-type system (e.g., a PC), the system described in Provisional Application Ser. No. 60/150,905 with respect to FIG. 7 and incorporated by reference herein, or virtually any other type of computing system that includes the ability to read and execute the software code, usually including a processor and memory.

Methodology

Figure 3:
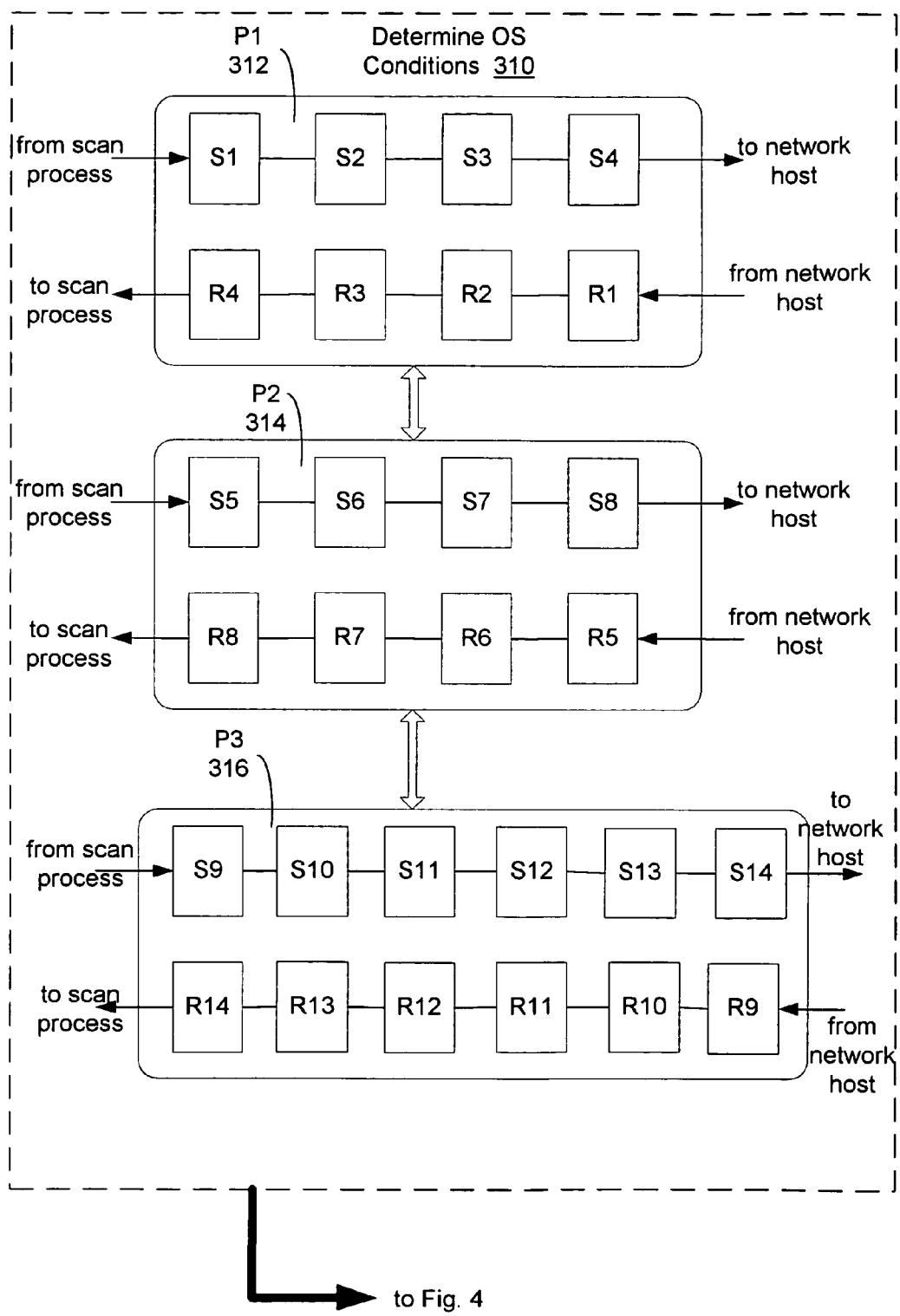
FIGS. 3–4 illustrate a flow chart of an embodiment of a method in accordance with the present invention.
Figure 4:
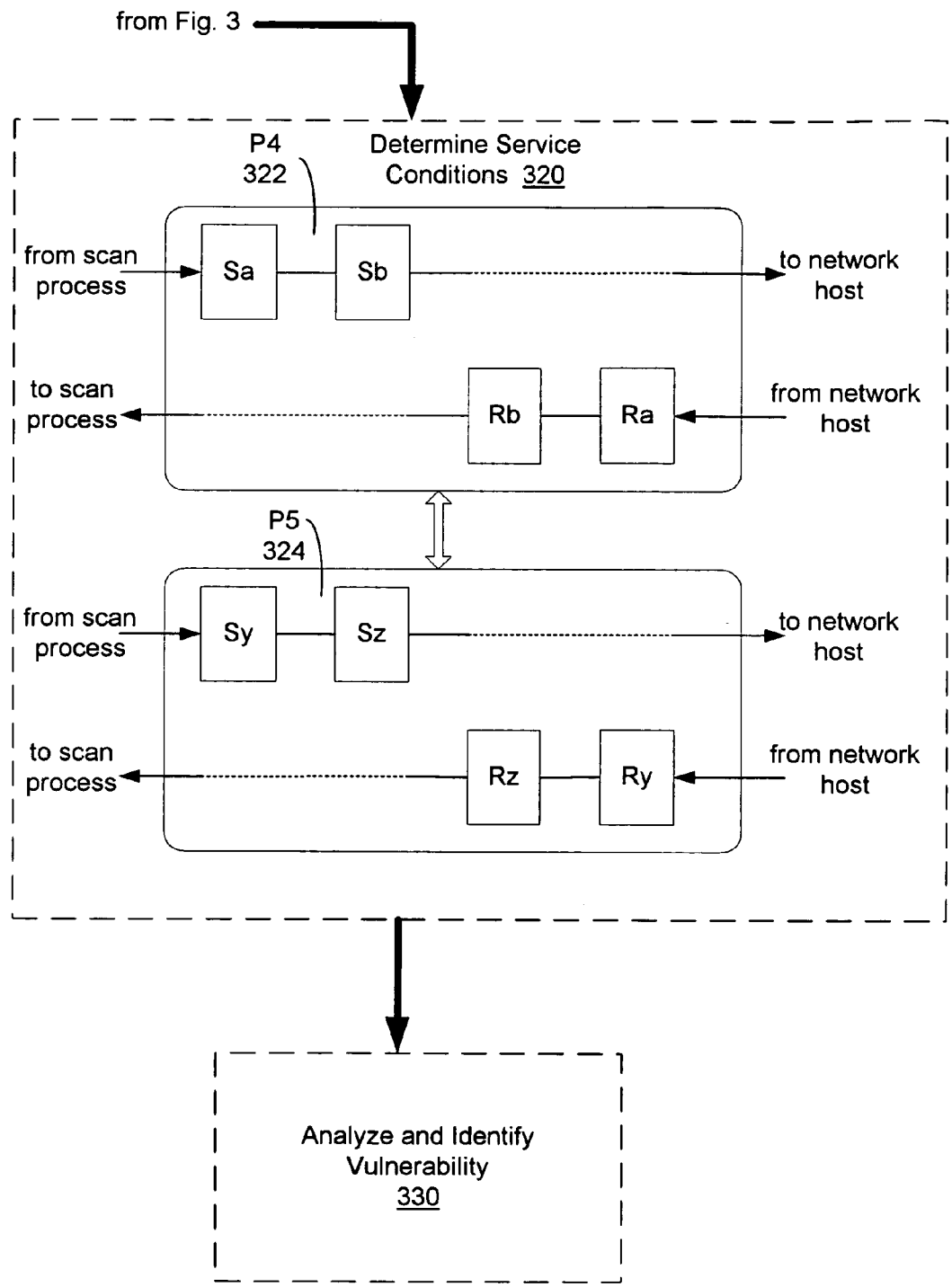

FIGS. 3–4 illustrate a generalized flow chart of an embodiment of a method in accordance with the present invention. FIGS. 3–4 illustrates the steps of first determining a plurality of network conditions, including identifying an operating system condition and service condition, and then using those conditions to identify vulnerabilities.

Step 310 first identifies an operating system condition of the host, and in some embodiments includes identifying an operating system type, version, and patch level. Step 310 is divided into three phases, P1–P3. P1 312 first begins to determine an operating system of a host on network 235 (FIG. 2). P2 314 furthers determines the operation system for the host. P3 316 finalizes the determination of the operating system. P2 uses information determined from P1, and, likewise, P3 uses information determined from P2. As such, phases 312, 314, and 316 are dependent on each other for determining the conditions of the remote host on network 235. As should be understood, packets sent in each phase are generated by one or more scanning processes 240.

The following description discusses the types of packets sent and received in accordance with an embodiment of the invention. A person of ordinary skill in the art will generally be familiar TCP/IP packet formation and structure and will generally be familiar with the teaching of W. Richard Stevens, "TCP/IP Illustrated," Vols. 1–4 (Addison-Wesley 1994); Douglas E. Corner, "Internetworking with TCP/IP," Vols. 1–3 (4$^{th}$ Ed., Prentice Hall, 1995, 2000); or other similar reference.

A network under test will be defined by a range of addresses. In P1 312, a scanning process 240 first transmits a first set of test packets all of the addresses in the range for the network 235, where the packets are addressed in accordance with CIDR (Classless InterDomain Routing), described in detail in RFC-1519. Hosts at active addresses will respond to at least one of the packets sent (described in more detail below). As a result of P1, hosts on the network are identified and, based on the information sent in responsive packets, the system can start to identify the operating systems of each host.

In one embodiment, there are four types of test packets $S_1$–$S_4$ that are sent in sequence from a scan process during this phase P1 to each network address:

$S_1$: a SYN packet with false flag in the TCP option header.

$S_2$: a Fragmented UDP packet with malformed header (any header inconsistency is sufficient), where the packet is 8K in size.

$S_3$: a FIN Packet of a selected variable size or a FIN packet without the ACK or SYN flag properly set.

$S_4$: a generic, well-formed ICMP ECHO request packet.

It is to be understood that although the above-listed types of test packets are used in one embodiment, other types of test packets may be used in other embodiments of the invention yet fall within the scope of the present invention. Further although four test packets ($S_1 \ldots S_4$) are illustrated, it is to be understood that in other embodiments more or fewer test packets could be sent.

The test packets ($S_1 \ldots S_4$) sent to each host initiate a "reflex test". That is, the set of packets is sent to encourage an automatic response or "reflex" from a host. Listed below is a set of reflex packets $R_1 \ldots R_4$ that, based on the inventors' experience, are typically returned in response to the test packets $S_1 \ldots S_4$. As should be understood, each packet in the set of packets generally elicits a corresponding automatic response from the host, i.e., reflex packet $R_1$ is sent in response to test packet $S_1$, $R_2$ to $S_2$, etc.

$R_1$: The host usually returns a packet with the SYN and ACK flags set, an 8 Byte header, and no data. The correct behavior based on RFC-793 is not to respond to this packet, however, a large number of systems do not follow the RFC in this regard.

$R_2$: The host usually returns a reassembled packet with the ACK bit set and a value in the fragment offset field.

$R_3$: The returned packet varies, depending upon the implementation of the TCP stack. Based on RFC 793 (which can be found at www.ietf.org/rfc), the expected response from the remote system is not to respond, but some systems return a packet with the RST (Reset) bit set.

$R_4$: The host usually returns a packet with a variable length ICMP header and a packet with the ECHO REPLY option set.

Each operating system responds to the test packets differently. In some cases, packets distinct from those described above are returned and in some cases no packet is returned in response to a particular test packet. Further, the order in which packets are returned will frequently vary. In all cases, the response packet (or lack thereof) contains information which is useful to begin to identify the operating system on a particular host. For instance, a host running Solaris will respond differently to some packets than a host running Windows. Therefore, based on a host's response to the set of test packets ($S_1 \ldots S_4$), this returned set of reflex packets is generally sufficient to initially infer operating system conditions of the host by comparing the responses (by scan analysis component 220) to a preexisting database 215 of possible responses or "reflex signatures."

Based on information communicated from scan analysis component 220 to scan coordination component 210 regarding the operating system of the host, phase 2, P2 314, further determines the operating system conditions of the host using the first set of reflex packets from P1. More specifically, the information received in the responsive packets from P1 is used to refine the contents of test packets sent in P2.

As with P1, when compared by scan analysis component 220 to a preexisting database 215 of "reflex signatures," the responses to the test packets $S_5 \ldots S_8$ provide data that makes it possible to further identify additional operating system conditions of the remote host. The second set of test packets $S_5 \ldots S_8$ involves sending packets directly to the remote host, and includes:

$S_5$: a generic well-formed TCP Header set to 1024 bytes in size.

$S_6$: a packet requesting an ICMP Timestamp.

$S_7$: a packet with min/max segment size set to a selected variable value.

$S_8$: a UDP packet with the fragment bit set.

The second set of reflex packets from the host usually includes (based on the inventors' experience):

$R_5$: a TCP initial window set to a non-zero value.

$R_6$: an ICMP timestamp reply.

$R_7$: a packet with a segment size that varies depending on $S_7$.

$R_8$: a UDP packet or a packet with the SYN and ACK flags set.

Phase 3, P3 316, further determines the operating system conditions for the host. Again, based on information communicated from scan analysis component 220 to scan coordination component 210 regarding information received in P2, packet contents in P3 are refined. P3 transmits a third set of test packets $S_9 \ldots S_{14}$ to the host as follows:

$S_9$: a TCP packet with the header and options set incorrectly.

$S_{10}$: a well-formed ICMP packet.

$S_{11}$: a fragmented TCP or UDP packet.

$S_{12}$: a packet with an empty TCP window or a window set to zero.

$S_{13}$: a generic TCP packet with 8K of random data.

$S_{14}$: a SYN packet with ACK and RST flags set.

The third set of reflex data packets $R_9 \ldots R_{14}$ from the host usually includes (based on the inventors' experience):

$R_9$: a packet with a 0 sized header or no response.

$R_{10}$: a packet that will vary depending upon the service and the host's implementation of the TCP/IP stack.

$R_{11}$: a packet containing packet sequence information.

$R_{12}$: a TCP packet having a header with offset information.

$R_{13}$: a packet with the ACK flag set and the segment size bit set.

$R_{14}$: a packet with the ACK or RST bits set.

By comparing the returned data in reflex packets $R_9 \ldots R_{14}$ (as well as $R_1 \ldots R_8$) to a database 215 containing "reflex signatures", not only can the operating system type be identified (e.g., Solaris or Windows) but the version and patch level can be reliably identified as well.

For instance, each operating system version and patch level will result in differing responses to the test packets in P1–P3. A host running Solaris 2.5 will respond differently than one running Solaris 2.6 will respond differently from one running Windows 98. Using a three phase sequence of packets, enough information can be efficiently gathered to reliably identify operating system conditions, including type, version, and patch level.

After the operating system conditions are identified in step 310, the service conditions for a host are next identified in step 320. First the open ports on the remote host are determined and then the processes listening on those ports are determined. A comprehensive list of sample ports available to be tested includes, but is not limited to:

3com-tsmux; 3ds-lm; 3l-l1; 3m-image-lm; 914c-g; 9pfs; BackOrifice; BackOrifice2k; InCommand Trojan; NetBus-12345; NetBus-12346; Object Server; Remote File Sharing; StacheldrahtMaster; Trinoo Control; Trinoo Registration; Trinoo Slave; X11; aal-lm; abbaccuray; about; acas; accelx; accessbuilder; aci; acmaint_dbd; acmaint_transd; acmsoda; acp; acr-nema; adapt-sna; aed-512; af; afpovertcp; afs; afs3-bos; afs3-callback; afs3-errors; afs3-fileserver; afs3-kaserver; afs3-prserver; afs3-rmtsys; afs3-update; afs3-vlserver; afs3-volser; airs; alpes; alta-ana-lm; amanda; amandaidx; amidxtape; ampr-info; ampr-inter; anet; ansanotify; ansatrader; ansoft-lm-1; ansoft-lm-2; anynetgateway; aol; aol-1; aol-2; aol-3; apertus-ldp; apple-licman; appleqtc; appleqtcsrvr; applix; apri-lm; arcisdms; ariel1; ariel2; ariel3; arms; as-servermap; asa; asa-appl-proto; asip-webadmin; aspeclmd; aspentec-lm; at-3; at-5; at-7; at-8; at-echo; at-nbp; at-rtmp; at-zis; atex_elmd; atls; atm-zip-office; ats; audio-activmail; audion-ews; audit; auditd; aurora-cmgr; aurp; auth; autodesk-lm; avian; axon-lm; banyan-rpc; banyan-vip; bbn-mmc; bbn-mmx; bdp; bftp; bgmp; bgp; bgpd; bgs-nsi; bh611; bhevent; bhfhs; bhmds; biff; biimenu; bind; bl-idm; blackboard; blackjack; blueberry-lm; bmap; bnet; bootclient; bootpc; bootps; bootserver; btx; bus-boy; bwnfs; bytex; cab-protocol; cableport-ax; cacp; cadis-1; cadis-2; cadkey-licman; cadkey-tablet; cad-lock-1000; cadlock-770; cadsi-lm; cal; callbook; canna; ccmail; cdc; cdfunc; cfdptkt; cfengine; cfingerd; cfs; chargen; checkpoint-fwz; checksum; chromagrafx; chshell; cichild-lm; cichlid; cisco-fna; cisco-sys; cisco-tna; citadel; cl-1; clearcase; cloanto-net-1; clvm-cfg; cmip-man; coauthor; codaauth2; codasrv; codasrv-se; commerce; commplex-link; commplex-main; compressnet-2; compressnet-3; comscm; con; concert; conf; conference; confluent; connlcli; contentserver; courier; covia; creativepartnr; creativeserver; cronus; crs; csdm-1468; csdm-1472; csdmbase-1467; csdmbase-1471; csi-sgwp; csnet-ns; ctf; cucme-1; cucme-2; cucme-3; cucme-4; cuillamartin; custix; cvc; cvc_hostd; cvspserver; cybercash; cycleserv; cycleserv2; cypress; cypress-stat; dantz; dasp; datasurfsrv; datasurfsrvsec; datex-asn; dayna; daytime; dbase; dbbrowse; dberegister; dbreporter; dbsa-lm; dbstar; dc; dca; dcp; dcs; ddm-dfm; ddm-rdb; ddm-ssl; dec-notes; decap; decauth; decbsrv; decladebug; dectalk; decvms-sysmgt; deos; deslogin-2005; deslogin-3005; deslog-ind; device; device2; deviceshare; dhcpv6-client; dhcpv6-server; diagmond; digital-vrc; direct; dis; discard; distrib-netassholes; dixie; dlip; dls-197; dls-2047; dls-mon; dls-monitor; dlsrpn; dlswpn; dmdocbroker; dn6-nlm-aud; dn6-smm-red; dna-cml; dnsix; docstor; domain; doom; down; dpsi; dsETOS; dsf; dsfgw; dsp; dsp3270; dtag-ste-sb; dtk; dtspc; dvl-activemail; dvs; dwf; echo; echo-udp; editbench; efs; eicon-server; eicon-slp; eicon-x25; eklogin; ekshell-2106; ekshell-545; elan; elcsd; ellpack; embl-ndt; emce; emfis-cntl; emfis-data; entomb; entrustmanager; entrusttime; equationbuilder; erpc; esl-lm; esro-gen; essbase; eudora-set; evb-elm; exchange; exec; eyelink; fatserv; fax; fc-cli; fc-ser; fcp; fhc; fics; finger; flexlm; fln-spx; fodms; font-service; ftp; ftp-agent; ftp-data; ftsrv; fujitsu-dev; fujitsu-dtc; fujitsu-dtcns; funkproxy; gacp; gandalf-lm; garcon; gdomap; gdp-port; genie; genie-lm; genradmux; ginad; globe; glogger; go-login; goldleaf-licman; gopher; gppitnp; graphics; gridgen-elmd; gss-http; gss-xlicen; gtegsc-lm; gv-us; gwha; hacl-cfg; hacl-gs; hacl-hb; hacl-local; hacl-probe; hacl-test; hassle; hdap; hecmtl-db; hems; here-lm; hermes; hiq; hostname; hosts2-ns; hp-3000-telnet; hp-alarm-mgr-383; hp-alarm-mgr-783; hp-collector-381; hp-collector-781; hp-managed-node-382; hp-managed-node-782; http; http-alt; http-mgmt; http-proxy; http-rpc-epmap; https; hybrid; hybrid-pop; hylafax; hyper-g; iad1; iad2; iad3; iafd-base; iafserver; iasd; ibm-app; ibm-cics; ibm-db2; ibm-mqseries; ibm-pps; ibm-res; ibm_wrless_lan; ica; icad-el; icb; iclpv-dm; iclpv-nlc; iclpv-nls; iclpv-pm; iclpv-sas; iclpv-sc; iclpv-wsm; idfp; ies-lm; ifor-protocol; igi-lm; iiop; iis4; imap2; imap3; imap4-ssl; imsldoc; imsp; imtc-mcs; infoman; informatik-lm; infoseek; ingres-net; ingreslock; innosys; innosys-acl; insituconf; instl_bootc; instl_boots; intecourier; integra-sme; intellistor-lm; interbase; interhdl_elmd; intrinsa; intuitive-edge; invokator; ipcd; ipcserver; ipdd; ipx; irc; irc-6667; irc-6668; irc-serv-529; irc-serv-6666; is 99c; is 99s; isakmp; isi-gl; isis; isis-bcast; iso-ill; iso-ip; iso-tpo; iso-tsap; iso-tsap-c2; isode-dua; issd; ivs-video; ivsd; jetdirect; kauth; kerberos; kerberos-adm; kerberos-sec; kerberos_master; keyserver; kip; kis; klogin; knet-cmp; kpasswd; kpasswd5; kpop; krb524; krb_prop; krbupdate; kryptolan; kshell; kx; la-maint; lam; lansource; laplink; ldap; legent-1; legent-2; liberty-lm; licensedaemon; link; linuxconf; linx; listen-2766; ljk-login; loadsrv; loc-srv; localinfosrvr; lockd; locus-con; locus-map; login; lonewolf-lm; lotusnote; lupa; maconudp; magenta-logic; mailbox; mailbox-lm; mailq; maitrd; man; mapper-mapethd; mapper-nodemgr; mapper-ws_ethd; marcam-lm; matip-type-a; matip-type-b; mciautoreg; mcidas; mdbs_daemon; meta-corp; metagram; meter; mfcobol; mftp; micom-pfs; micromuse-lm; microsoft-ds; mimer; miroconnect; mit-dov; mit-ml-dev-83; mit-ml-dev-85; miteksys-lm; mloadd; mm-admin; mmcc; mobileip-agent; mobilip-mn; molly; mondex; monitor; montage-lm; mortgageware; mount; mpm; mpm-flags; mpm-snd; mpp; mptn; ms-rome; ms-shuttle; ms-sna-base; ms-sna-server; ms-sql-m; ms-sql-s; msg; msg-auth; msg-icp; msl lmd; msp; msql-1112; msql-4333; msrdp; multiplex; mumps; mvx-lm; mylex-mapd; mysql; nameserver; namp; ncd-conf; ncd-conf-tcp; ncd-diag; ncd-diag-tcp; ncd-pref; ncd-pref-tcp; nced; ncld; ncp; ncube-lm; ndm-requester; ndm-server; ndsauth; nerv; nest-protocol; netbios-dgm; netbios-ns; netbios-ssn; netcheque; netcp-395; netcp-740; netgw; netlabs-lm; netmapjm; netnews; netrcs; netrjs-1; netrjs-2; netrjs-3; netrjs-4; netsc-dev; netsc-prod; netstat; netview-aix-1; netview-aix-10; netview-aix-11; netview-aix-12; netview-aix-2; netview-aix-3; netview-aix-4; netview-aix-5; netview-aix-6; netview-aix-7; netview-aix-8; netview-aix-9; netviewdm1; netviewdm2; netviewdm3; netwall; netware-csp; netware-ip; new-rwho; newacct; news-144; news-2009; nextstep; nfa; nfs; nfsd-keepalive; nfsd-status; ni-ftp; ni-mail; nicname; nim; nimreg; nip; nkd; nlogin; nms; nms_topo_serv; nmsp; nnsp; nntp; notify; novastorbakcup; novell-lu6.2; npmp-gui; npmp-local; npmp-trap; npp; nqs; nrcabq-lm; ns; nsiiops; nss-routing; nsw-fe; ntalk; nterm; ntp; nucleus; nuts bootp; nuts_dem; objcall; objective-dbc; objectmanager; oc-lm; ocbinder; oceansoft-lm; ock; ocs amu; ocs_cmu; ocserver; odmr; ohimsrv; omserv; onmux; opalis-rdv; opalis-robot; opc-job-start; opc-job-track; openmath; openport; openvms-sysipc; ora-lm; oracle; orasrv; os-licman; ospfd; osu-nms; p3pw; pacerforum; padl2sim; passgo; password-chg; pawserv; pciarray; pcmail-srv;

pcnfs; pdap; pdap-np; pegboard; pehelp; peport; perfport; personal-link; ph; philips-vc; phone; phonebook; photuris; pim-rp-disc; pip; pipe_server; pipes; pirp; pop-2; pop-3; postgres; pov-ray; powerburst; ppp; pptp; print-srv; printer; priv-dial; priv-file; priv-mail; priv-print; priv-rje; priv-term; priv-term-l; prm-nm; prm-nm-np; prm-sm; prm-sm-np; profile; proshare1; proshare2; proshareaudio; prosharedata; prosharenotify; prosharerequest; prosharevideo; prospero; proxima-lm; prsvp; ptcnameservice; puparp; pwdgen; qbikgdp; qft; qmqp; qotd; qrh; quotad; radacct-1646; radacct-1813; radius-1645; radius-1812; raid-ac; raid-am-2007; raid-am-2013; raid-cc-2006; raid-cc-2011; raid-cd; raid-cs; raid-sf; rap-256; rap-38; rap-listen; rap-service; rcmd; rcp; rds; rds2; re-mail-ck; relief; rellpack; remote-kis; remotefs; rexec; rfa; rfe; rfx-lm; rgtp; ricardo-lm; rightbrain; rimsl; ripd; ripng; ripngd; ris; ris-cm; rje; rkinit; rlogin; rlp; rmonitor; rmonitor_secure; rmt; rna-lm; robcad-lm; route; rpasswd; rpc2portmap; rplay; rrh; rsh-spx; rsvd; rsvp_junnel; rtelnet; rtip; rtsclient; rtsp; rtsserv; rwhois; rwrite; rxe; s-net; sae-urn; saft; sas-1; sas-2; sas-3; sbook; scc-security; sco-websrvrmg3; scohelp; scoi2odialog; scoremgr; scrabble; screencast; scx-proxy; sd; sdad-mind; sdfunc; sdlog; sdnskmp; sdreport; sdsc-lm; sdserv; sdxauthd; search; secureidprop; securid; semantix; send; servexec; servserv; set; sfs-config; sfs-smp-net; sftp; sgcp; sgi-dgl; sgmp; sgmp-traps; shadowserver; shell; shiva_confsrvr; shivadiscovery; shivahose; shivasound; shois; shrinkwrap; siam; sift-uft; silverplatter; simap; simba-cs; sj3; skkserv; skronk; smakynet; smartsdp; smip-agent; smpte; smsd; smsp; smtp; smtps; smux; snagas; snare; snews; snmp; snmp-tcp-port; snmptrap; snpp; sntp-heartbeat; socks; softcm; softpc; sonar; sophia-lm; spc; spsc; sql*net; sql-net; sqlserv; sqlsrv; squid-http; squid-ipc; src; srmp; srssend; ss7 ns; ssh; statsci1-lm; statsci2-lm; statsrv; stel; stmf; stone-design-1; streettalk; stun-p1; stun-p2; stun-p3; stun-port; stx; su-mit-tg; submission; submit; submitserver; subntbcst_tftp; sunrpc; supdup; supfiledbg; supfilesrv; support; sur-meas; svrloc; swift-rvf; symplex; synoptics-trap; synotics-broker; synotics-relay; syslog; systat; tabula; tacacs; tacacs-ds; tacnews; taligent-lm; talk; tam; tcp-id-port; tcpmux; tcp-nethaspsrv; teedtap; telefinder; telelpathattack; telelpathstart; telesis-licman; telnet; tempo; tenebris_nts; terminaldb-2008; terminaldb-2018; tftp; ticf-1; ticf-2; timbuktu; timbuktu-srv1; timbuktu-srv2; timbuktu-srv3; timbuktu-srv4; time; timed; timeflies; tlisrv; tn-tl-fd1; tn-tl-w2; tnETOS; tns-cml; tpdu; tpip; tr-rsrb-p1; tr-rsrb-p2; tr-rsrb-p3; tr-rsrb-port; track; troff; tserver; ttyinfo; uaac; uaiact; uarps; udt_os; ufsd; uis; ulistserv; ulp; ulpnet; umeter; unicall; unidata-ldm; unify; unitary; ups; ups-onlinet; urm; us-gv; utcd; utime; utmpcd; utmpsd; uucp; uucp-path; uucp-rlogin; valisys-lm; vat; vat-control; vemmi; venus; venus-se; vettcp; via-ftp; vid; video-activmail; videotex; virtual-places; vistium-share; visi-lm; vmnet; vmodem; vmpwscs; vnas; vpac; vpad; vpvc; vpvd; vsinet; vslmp; watcom-sql; watershed-lm; webster-2627; webster-765; who; whoami; whosockami-2009; whosockami-2019; wincim; wins; wizard; wnn6; wnn6_Cn; wnn6_DS; wnn6_Kr; wnn6_Tw; work-sol; world-lm; wpages; wpgs; www-dev; x25-svc-port; xaudio; xdmcp; xdsxdm; xfer; xinuexpansion1; xinuexpansion2; xinuexpansion3; xinuexpansion4; xinpageserver; xlog; xnmp; xns-auth; xns-ch; xns-courier; xns-mail; xns-time; xribs; xtreelic; xvttp; xyplex-mux; yak-chat; z39.50; zannet; zebra; zebrasrv; zephyr-clt; zephyr-hm; zion-lm; zserv; (1100 rows).

A series 322 of FIN, SYN, or generic TCP packets (that are RFC compliant) are sent to potential ports for the host. It should be noted that because the operating system is known, a set of potential ports is also known. In other words, not all operating systems will use the same open ports or services, and the information obtained in step 310 is used to select the packets (and content of those packets) to be sent. The responses to the set of test packets in phase P4 322 identifies open ports and some initial characteristics of services on those ports. This identification is a result of comparing information in the responses to that stored on database 215. The RFCs are very specific about how a service should respond to a given input and, therefore, the reflex response methodology can be used to accurately determine the specific service on a given port. It should be noted that there are thousands of RFCs that specify how remote host applications and services interact with TCP/IP networks and that each RFC speaks to the specific conditions that should be tested on a remote network.

For example, sending an "SYST" command to a port that is suspected of running FTP (c.f. RFC 959 "File Transfer Protocol") will respond with the type of operating system on the server, with the first word of the reply being the system name.

Example
220 foo.com FTP Server
SYST
215 UNIX Type: L8

Finally, in phase 5, P5 324, an additional set of packets is sent based on the results of P4. The additional set of at least one packet can be used to further determine service conditions. Ultimately, not only is the operating system type, version, and patch level identified for a host, but also each host service is identified with a version and patch level. When the service conditions are analyzed step 330, by comparison to database 215 or otherwise, vulnerabilities of the host (and, thus, the network) can be identified in a reliable and non-intrusive manner.

The following examples are responses from a telnet service (c.f RFC 200, 595, 596, 306, 288, and 2828) on a Solaris 2.6 system with a packet reply that occurs prior to the telnet connection being properly established by the remote host:

Example 1
192.168.0.100->192.168.1.100:22577   TCP   TTL:244 TOS:0x0 ID:30216 DF
*****PA* Seq: 0xD6A4A4C4 Ack: 0xA3112DF9 Win: 0x2328
TCP Options =>NOP NOP TS: 128361854 19495
FF FD 18 FF FD 1F FF FD 23 FF FD 27 FF FD 24 ........#..'..$ Example 2
192.168.0.100->192.168.1.100:25960   TCP   TTL:244 TOS:0x0 ID: 17070 DF
*****PA* Seq: 0x758B651 Ack: 0xA3C305F2 Win: 0x2328
TCP Options =>NOP NOP TS: 128370508 19668
FF FE 24 FF FA 18 01 FF F0 FF FA 23 01 FF F0 FF ..$........#....
FA 27 01 FF F0 .'...

These examples illustrate that two different versions of telnet will generate unique responses. From the first example, the service can be identified. From the second example, the service, version, and patch level can be identified. An additional packet (or set of packets) may be desirable to send to the port in the first example to further identify the version and patch level for the services.

Although the above-described embodiment of the invention is described with five sequences of test packets being sent to identify the type, version, and patch level of both the operating system and services operating on the remote host, other embodiments use more or fewer sequences to identify similar information.

The advantages of the methodology of the present invention are numerous. A method in accordance with the present invention provides vulnerability assessment that is clearly defined, fast, accurate, reliable, and non-intrusive to remote systems. A method in accordance with the present invention is difficult to detect by and does not appear as a standard intrusion to the network analyzed.

Moreover, a method in accordance with an embodiment of the invention is able to add new vulnerabilities and may also locate vulnerabilities not yet found. Such new vulnerabilities can be inferred from information stored in database 215 when analyzing new reflex signatures.

In addition to identifying vulnerabilities of a network, an embodiment of the invention could be adapted to determining if there were unauthorized applications on the system or software license violations. Further, another embodiment of the invention could be adapted to identifying "trojan" (malicious) applications on the host.

Good security practices and policies are well-defined in the Site Security Handbook, RFC-2196. An embodiment of the invention can identify violations of these, or other, practices and policies.

As should be understood, the present invention may be embodied in a storage medium (media) having instructions stored thereon which can be used to program a computer. The storage medium can include, but is not limited to, any type of disk including floppy disks, optical disks, DVD, CD ROMs, magnetic optical disks, RAMs, EPROM, EEPROM, magnetic or optical cards, or any type of media suitable for storing electronic instructions.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems and user applications. Ultimately, such computer readable media further includes software for performing the methods of an embodiment of the present invention as described above.

In another embodiment, a method of the present invention may be performed over a network. That is, the method of the present invention stored as processor readable code, in one embodiment, may be transferred in an electronic signal over a network (e.g., the Internet, a frame relay network, an ATM network, or a local area network).

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method of detecting a vulnerability of a network, comprising:

sending a first set of test packets to a remote host on the network;

receiving a first set of reflexive packets from the remote host in response to the first set of test packets, at least part of the first set of reflexive packets including header information that is unique to an operating system;

inferring the operating system;

sending a second set of test packets to the remote host;

receiving a second set of reflexive packets from the remote host in response to the second set of test packets, at least part of the second set of reflexive packets including header information that is unique to a service; and inferring the service, identifying a vulnerability of the network based on information obtained from the steps of identifying an operating system and identifying a service, wherein the first set of test packets includes:

a SYN Packet with false flag in the TCP option header;

a Fragmented UDP packet with malformed header (any header inconsistency is sufficient), where the packet is 8K in size;

a FIN Packets of a selected variable size or a FIN packet without the ACK or SYN flag properly set; and a generic, well-formed ICMP ECHO request packet;

a generic well-formed TCP Header set to 1024 bytes in size;

a Packet requesting an ICMP Timestamp;

a Packet with min/max segment size set to a selected variable value; and a UDP packet with the fragment bit set;

a TCP Packet with the header and options set incorrectly;

a well-formed ICMP Packet;

a Fragmented TCP or UDP packet;

a packet with an empty TCP window or a window set to zero;

a generic TCP Packet with 8K of random data; and a SYN Packet with ACK and RST flags set.

2. A method of examining a network, including:

identifying an operating system of a remote host, including a version and a patch level of the operating system with a first set of packets, the first set of packets comprising at least an operating system packet to determine the operating system, an operating system version packet to determine the operating system version based on the determined operating system, and an operating system patch level packet to determine the operating system patch level based on the determined operating system version;

identifying a service of the remote host, including a version and a patch level of the service with a second set of packets based on the identified operating system, the second set of packets comprising at least a service packet to determine the service, a service version packet to determine the service version based on the determined service, and a service patch level packet to determine the service patch level based on the determined service version; and identifying a vulnerability of the network based on information obtained from the steps of identifying an operating system and identifying a service.

3. The method of claim 2, wherein:

identifying the operating system includes sending the first set of packets to the remote host and receiving a second set of packets from the remote host in response to the first set of packets, and analyzing the second set of packets for inferential information indicative of the operating system; and identifying the service includes sending the third set of packets to the remote host and receiving a fourth set of packets from the remote host in response to the third set of packets, wherein information contained in the third set of packets is based on information received in the second set of packets, and analyzing the fourth set of packets for inferential information indicative of the service.

4. The method of claim 3, wherein the inferential information comprises header information associated with the second set of packets, at least part of the header information being unique to the identified operating system.

5. The method of claim 3, wherein the inferential information comprises header information associated with the fourth set of packets, at least part of the header information being unique to the identified service.

6. The method of claim 2, wherein identifying a service comprises directing communications to ports of the remote host based on the identified operating system.

* * * * *